June 10, 1952  G. J. PASKER  2,599,935
HYDRAULIC LINE COUPLING
Filed May 14, 1948

INVENTOR
G. J. PASKER
BY
Merrill M. Blackburn
ATTORNEY

Patented June 10, 1952

2,599,935

UNITED STATES PATENT OFFICE 2,599,935

HYDRAULIC LINE COUPLING

Gerald J. Pasker, Monticello, Iowa

Application May 14, 1948, Serial No. 26,963

4 Claims. (Cl. 284—18)

My present invention relates to coupling means for connecting two sections of a flexible hydraulic line in any situation in which it is desirable to have two sections readily connectible and disconnectible, but more particularly in situations where one of the connecting units may be, under conditions of use, pulled away from the other unit. Among the objects of this invention are the provision of a coupler of the type indicated which will become automatically disconnected in event of accidental separation of two connected units having two sections of a hydraulic line mounted thereon; the provision of improved means for closing the disconnected ends of the two sections of a hydraulic line which become separated in any manner; the provision of a coupling for connecting the two sections of a hydraulic line, which coupling is provided with a vent means permitting the escape of air from the interior of the coupling when the parts are connected; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Figure 1:
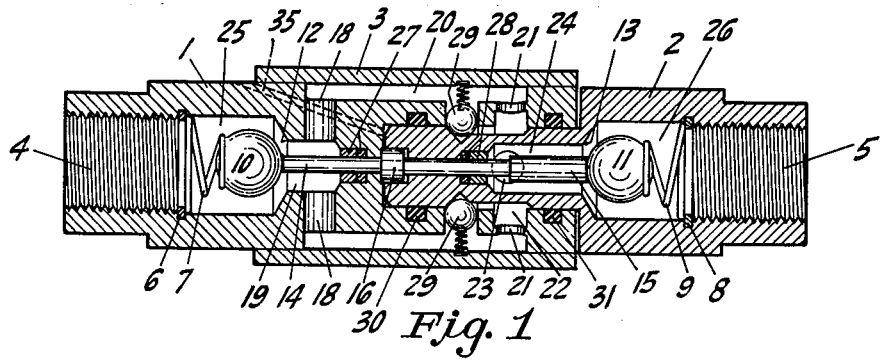
Fig. 1 represents a longitudinal section of the two units of a coupling of the type indicated when connected in position for use.
Figure 2:
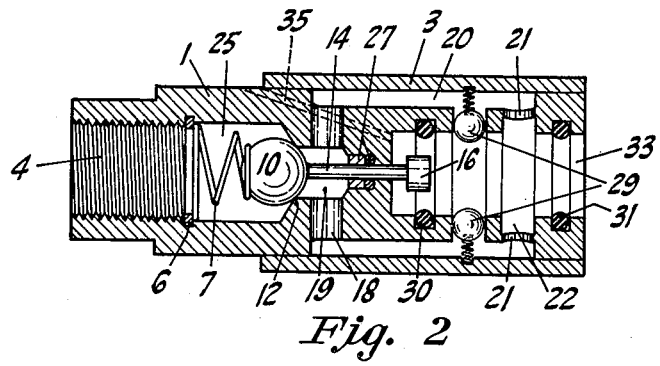
Fig. 2 represents a longitudinal section of the female unit of such a coupling.
Figure 3:
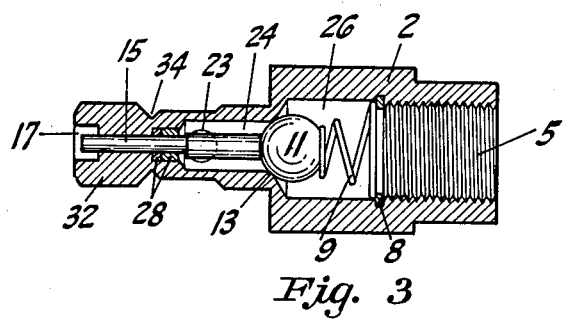
Fig. 3 represents a longitudinal section of the male unit of a coupling in accordance with my invention.

Reference will now be made in greater detail to the annexed drawings for a more complete description of this invention. This coupling is shown as comprising a pair of body members 1 and 2 and a surrounding sleeve 3. The female coupling unit or socket 1 has a connector with an internally threaded opening 4 for connection to a flexible hose or any other suitable fluid conveying means, while the male body member or plug has a connector with a similarly threaded opening 5 for connection to a second hose or the like, not shown in the present drawings. The connected ends of these two body units are surrounded by a sleeve 3, carried by the female socket and the major portion of which is spaced from the body members.

At the inner end of the threaded portion of the opening 4 is a ring 6 which forms a shoulder against which the spring 7 may bear. A similar ring 8 is at the inner end of the spring 5 and serves as an abutment against which the spring 9 may press. These springs 7 and 9 press against the balls 10 and 11 which serve as valve-closure members pressing against the seats 12 and 13. Pressing against the balls 10 and 11 are pins 14 and 15 which fit closely but slide freely in the body members 1 and 2, being guided thereby so that the balls 10 and 11 will be seated accurately against the valve-seats 12 and 13.

The pin 14 is provided with a cylindrical head 16 which slides into the opening 17 in the forward end of the body member 2. As shown in Fig. 1, engagement of the head 16 with pin 15 causes unseating of both balls 10 and 11 so that any fluid under pressure in the hydraulic line may flow freely through these two valves. Openings 18 in the body member 1 connect the opening 19 with the space 20 between the sleeve 3 and the body member 1, while comparable openings 21 connect the space 20 with the opening 22 from which leads an opening or openings 23 to the space 24 within the body member 2. The balls 10 and 11 are located in chambers 25 and 26 which are connected to the openings 19 and 24. It will therefore be seen that there is a clear passage from the opening 4 to the opening 5 which will be closed at two points when the coupling is uncoupled, the balls 10 and 11, seated at 12 and 13, preventing escape of the hydraulic fluid from either hose.

Neoprene rings 27 and 28 prevent building up of any pressure which would tend to cause separation of the two body units. Spring-pressed balls 29 tend to prevent separation of the body members 1 and 2, inadvertently. However, the springs are so chosen that a pull of thirty pounds, approximately, will cause the springs to yield sufficiently so that the member 2 may be withdrawn from the member 1, thus permitting the coupling to become uncoupled in event the hitch between the drawing and the drawn members becomes disconnected. Gaskets 30 and 31 prevent leakage of hydraulic fluid around the reduced portion of body member 2.

When the reduced portion 32 of body member 2 is inserted in the opening 33 of body member 1 and shoved in until the balls 29 seat in the groove 34, the two parts of the coupling are securely fastened together, and the balls 10 and 11 are unseated from the seats 12 and 13. This results in a clear passageway from the opening 4 to the opening 5 which permits the flow of the hydraulic fluid from the pump on the traction unit to the point of use on the drawn unit. Similarly, when a sufficient pull is exerted in opposite directions upon the units 1 and 2, the result is that the balls 29 are unseated and the members 1 and 2 are separated. An air vent 35 allows air to escape in front of the part 32 when the parts are being coupled and allows air to enter when the parts are being uncoupled. The advantages of this are obvious.

It will of course be understood that there may be departures from the structure disclosed herein without departing from the scope of the claims annexed hereto.

Having now described my invention, I claim:

1. A female element for a coupling for fluid pressure lines comprising a body member having a longitudinal opening therethrough, different sections of the opening having different diameters, the opening at one end being screw-threaded for the attachment of a tubular member having therein a fluid under pressure, the next section of the opening being of approximately the same diameter as the first and containing a ball and a spring actuating said ball in one direction, the third section of said opening being of less diameter than the second, there being a shoulder between the second and third sections of said opening, the spring actuating said ball into engagement with the shoulder when it is not forcibly unseated, the fourth section of said opening being of less diameter than the third, a guiding pin connected to said ball and slidably received in said fourth section of the opening, and the fifth section of the opening being of a greater diameter than the fourth, an intermediate portion of the female element being of a less diameter than the remainder thereof, and a sleeve surrounding the intermediate portion and forming therewith a compartment for the reception of a fluid under pressure, the end portions of said compartment having openings connecting it with the third and fifth sections of the longitudinal opening.

2. A fluid pressure hose coupling, comprising a socket member having a cylindrical casing with a plug-receiving socket in the inner end and having a hose connector extending from the outer end, said socket member having a continuous longitudinally positioned bore with a valve seat in the bore, and the bore having a reduced section, a valve in the connector end of the socket member positioned to coact with the said valve seat to prevent fluid passing from the connector to the plug-receiving socket, a transversely situated partition in the socket member, having a bore with a reduced section extending through the transversely situated partition in said socket member, a stem slidably mounted in the reduced section of the bore, said cylindrical casing having longitudinally arranged channels therein and ports in communication with the inner and outer ends of the channels and said bore at points on opposite sides of the said partition, said casing having laterally extending openings communicating with said bore at points between said ports, spring-actuated balls positioned in the said laterally situated openings and extending into the said plug-receiving socket, a plug positioned in the plug-receiving socket, having a hose connector on the outer end and having a continuous bore extending therethrough, and an annular recess positioned in engagement with the spring-actuated balls of the cylindrical casing and having a substantially radial opening therein providing communicating means between the bore of said plug and the port in said casing communicating with the outer end of said channel.

3. In a fluid pressure hose coupling, a pair of conduit members connected together, each having a fluid passage, including a valve seat and a valve biased to close against the seat but adapted to be moved away from the seat when said conduit members are coupled together, said conduit members having telescoping portions formed with aligned pin-receiving bores therein, a valve stem positioned in each of said aligned bores and shiftable axially therein, each pin positioned to shift the associated valve away from its seat, a head on one of said valve-operating pins larger than the associated bore, whereby the movement of said pin in a valve-opening direction is limited, and means forming a recess in the inner end of the conduit member carrying the other pin completely receiving said head, the pin carried by said last mentioned conduit member being engaged by said head, whereby, when the conduit members are brought into coupling relation, both of said valves are opened, the depth of said recess being such that the inner end of the conduit carrying said other pin is contacting the other conduit around said head, and said head contacts the bottom of said recess and thereby limits the movement of said head and the associated pin in the direction toward said other pin, whereby both valves are held in their open position.

4. In a fluid pressure hose coupling, a coupling member comprising a body having a longitudinal bore extending therethrough and having a valve seat therein, a valve adapted to be positioned against said seat, a spring urging said valve against said valve seat, a pin extending longitudinally of said body and engaging said valve at one end and at the other end extending outwardly from said coupling member, an enlarged head on said pin, a second coupling member comprising a body formed as a plug with a longitudinal bore extending therethrough, said bore having a valve seat, a valve adapted to be positioned against said seat, a spring urging said valve against its valve seat, said plug having a recess in the end thereof receiving said head and having substantially the same axial and diametrical dimensions as said head, and a pin extending longitudinally of the bore in said plug and extending into said recess, whereby, when said plug is inserted into said first mentioned coupling member, a distance sufficient to cause the end of said recessed plug to engage and embrace said head, when the latter lies substantially against the end of said first mentioned coupling member, the pin in said plug engaging said head and being moved by the head as the latter approaches the bottom of the recess, whereby the valve in said plug is opened, and means acting between the inner portion of one coupling member and the plug portion of the other coupling member yieldably holding said coupling members in connected relation.

GERALD J. PASKER.

REFERENCES CITED

The following references are of record in the file of this patent:

UNITED STATES PATENTS

| Number | Name | Date |
|---|---|---|
| 95,528 | Smith | Oct. 5, 1869 |
| 109,695 | Westinghouse, Jr. | Nov. 29, 1870 |
| 997,875 | Warrington | July 11, 1911 |
| 1,435,103 | Bruce | Nov. 7, 1922 |
| 1,847,684 | Albertine | Mar. 1, 1932 |
| 1,977,867 | Tear | Oct. 23, 1934 |
| 2,108,714 | Hirsch et al. | Feb. 15, 1938 |
| 2,359,648 | Jones | Oct. 3, 1944 |

FOREIGN PATENTS

| Number | Country | Date |
|---|---|---|
| 16,361 | Great Britain | of 1887 |
| 592,757 | France | May 7, 1925 |
| 799,937 | France | June 23, 1936 |